3,813,257
COMPOSITE STRUCTURE AND METHOD OF PREPARING THE COMPOSITE STRUCTURE
James C. West, Akron, Ohio, assignor to The Goodyear Tire & Rubber Company, Akron, Ohio
No Drawing. Continuation of application Ser. No. 105,683, Jan. 11, 1971, which is a continuation of application Ser. No. 18,374, Mar. 12, 1970, which is a continuation of application Ser. No. 842,789, June 30, 1969, which in turn is a continuation of application Ser. No. 602,487, Dec. 19, 1966, all now abandoned. This application May 9, 1972, Ser. No. 251,627
Int. Cl. B44d 1/092
U.S. Cl. 117—47 R          5 Claims

ABSTRACT OF THE DISCLOSURE

A method of preparing a composite structure of a cured polyurethane adhered to a treated elastomer, which comprises the steps (A) treating the elastomer with freshly prepared chlorine water, (B) substantially drying the heated elastomer by evaporation, (C) applying a liquid polyurethane reaction mixture to the treated elastomer, and (D) curing the reaction mixture.

---

This is a continuation of application Ser. No. 105,683 filed Jan. 11, 1971, which is a streamline continuation of application Ser. No. 18,374 filed Mar. 12, 1970, which is a streamline continuation of application Ser. No. 842,789 filed June 30, 1969, which is a streamline continuation of application Ser. No. 602,487 filed Dec. 19, 1966, which are all abandoned.

This invention invention relates to a method of preparing a composite structure and to the composite structure. More particularly, this invention relates to a method of conditioning the surface of an elastomeric material and applying a polyurethane coat to the conditioned surface and to the coated surface-conditioned article.

Polyurethanes are known for their superior physical properties such as age resistance and abrasion resistance and capable of having a high decorative gloss. They are useful as protective coatings for various elastomeric rubber-like materials which are relatively deficient in these properties. However, it has long been recognized that it is difficult to achieve adherent coatings of polyurethane on the surface of elastomeric rubber-like articles. Such adherent coatings are particularly difficult to achieve where the surfaces of the rubber-like articles are subject to flexing. Usually, in such instances, special adhesives and bonding cements are required to effectively bond the polyurethane to the surface of the elastomeric article.

Therefore, it is an object of this invention to provide a method for conditioning the surface of an elastomeric article. It is a further object to provide a method of coating a surface of a rubber-like material with a polyurethane wherein the surface of the rubber-like material has been conditioned prior to applying the coat of polyurethane. It is an additional object to provide such a polyurethane coated rubber-like material.

In accordance with this invention it has been found unexpectedly that a method of preparing a composite structure comprising a layer of a cured polyurethane adhered to a treated surface of an elastomeric material comprises the steps of (a) treating a surface of an elastomeric material with chlorine water, (b) substantially drying the treated surface of the elastomeric material, (c) applying a coat of a liquid polyurethane reaction mixture to the treated surface of the elastomeric material, and (d) curing the polyurethane reaction mixture to form an integral composite structure.

Thus, in the practice of this invention a composite structure comprises a layer of a cured polyurethane adhered to a treated surface of an elastomeric material, the said treated surface of the elastomeric material having been treated with chlorine water and substantially dried before adhering the polyurethane to the surface of the elastomeric material.

Various elastomeric rubber-like materials can be used in this invention. Rubbery polymers and copolymers are preferable. Representative examples of suitable elastomeric materials are natural rubber and the various synthetic rubbers such as rubbery polymers of conjugated dienes including polychloroprene, the rubber copolymers of butadiene and styrene which contain a major proportion of butadiene, particularly copolymers of butadiene and styrene of the hot and cold SBR type which contain from 70 to 80 percent by weight of butadiene, copolymers of butadiene and acrylonitrile, elastomeric polymers of isoprene and of 1,3-butadiene. Also, mixtures of these elastomeric materials and mixtures of these rubber-like materials with butyl rubber, which is a polymerization product of a major proportion of a monoolefin such as butylene, and a minor portion of multiolefin, such as butadiene and isoprene, and with terpolymers of ethylene, propylene and a minor proportion of a diene, may be used.

In the practice of this invention, at least one surface of the rubber-like elastomeric material is treated with chlorine water, wherein the chlorine water contains from about 0.1 to about 0.2 percent by weight available chlorine at a temperature of from about 20° C. to about 30° C. The surface of the rubber-like material is treated by contacting the said surface with the chlorine water for about 3 to about 15 minutes. The surface of the elastomeric material can be treated with the solution over a wide temperature range. Representative suitable temperatures of the surface of the elastomeric material can range from about 0° C. to about 125° C. although a temperature of from about 20° C. to about 60° C. is usually more desirable. The temperature of the chlorine water can vary over a wide range such as from about 10° C. to about 50° C., although a temperature of from about 20° C. to about 30° C. is usually desired to facilitate easy handling of the chlorine water.

The chlorine water is then removed from the surface of the rubber-like material and it is usually desired to then essentially dry the chlorine water treated surface of the rubber-like material.

To the treated surface is then applied a coat of a liquid polyurethane reaction mixture. The polyurethane reaction mixtures used in this invention comprise a reactive hydrogen-containing polymeric material and an organic polyisocyanate. Usually a solvent is added to the reaction mixture so that it will be in the form of a fluid mixture or solution. Generally, sufficient solvent is added to form a solution containing from about 40 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 55 percent or higher is generally desired.

The reactive hydrogen-containing polymeric material used comprises at least one member selected from the group consisting of polyester polyols, polyesteramides, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 3000. (If the molecular weight of the reactive hydrogen-containing material is too low, the polyurethane will not have sufficient elasticity). Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethane of this invention can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols and polyalkylene ether-thioether glycols or triols. Generally, the polytetramethylene ether glycols are the preferred polyether glycols.

Representative examples of dihydroxy-terminated polymers of conjugated diene hydrocarbons are dihydroxy-terminated polymers of isoprene and butadiene.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, tolidine, dichlorobenzidine, and methylene-bis-chloroaniline.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl-isocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate, are preferred. For convenience, these diisocyanates are referred to as TDI, MDI and TODI, respectively.

The polyurethane polymers of this invention are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-conaining groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups. This prepolymer, itself a polyurethane, is then usually dissolved or dispersed in the solvent to form a solution or dispersion which is then reacted with a catalyst, chain extending agent, and/or a crosslinking agent to form a polyurethane reaction mixture.

Other methods known to those skilled in the art of preparing polyurethane reaction mixtures with or without solvents being present may also be used.

A catalyst can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids.

Agents which promote chain extension and crosslinking of the polymer are also useful and are sometimes known as curing agents. Aromatic diamines, aliphatic diamines, hydrocarbon diols such as ethylene glycol and butylene glycol, hydroxyl-amines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general the bifunctional materials yield products having superior spraying properties. Representative classes of compounds suitable for use as such agents are glycols, diamine having primary or secondary amino groups. Representative examples of suitable compounds belonging to these classes are glycols such as ethylene glycol, 1,3-propane-diol, 1,4-butane-diol and glycerol; aliphatic diamines such as ethylene diamine, trimethylene diamine, 1,4-cyclohexane bis-methylamine, and hexamethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-amino-benzyl analine, and o- and p-aminodiphenyl-amine; hydroxy amines such as triethanol amine, and 2-amino-ethyl alcohol. The preferred crosslinking agents are butane diol and the chloroamines such as ortho-dichlorobenzidine and methylene bis ortho-chloroaniline. The latter two chloroamines above are sometimes referred to herein for convenience as ODCB and MOCA, respectively.

A method for selecting the diisocyanates and diamines which form sprayable liquid reaction mixtures that can be mixed and used with a single container-type spray gun is the boiling methylene chloride turbidity test. By this method 0.2 to 0.5 molar solutions of the diisocyanate and diamine are made with methylene chloride. Equal molar amounts of the respective methylene chloride solutions of diisocyanate and diamine are raised to the boiling temperature and mixed. If a turbidity develops inside of 15 to 30 seconds, this combination of diisocyanate and diamine will not yield a reaction mixture which can be sprayed under normal conditions because of the high reaction rate. However, this combination can be sprayed successfully at a lower temperature or by using a spray gun having a mixing head. On the other hand, those mixtures of diisocyanate and diamine which do not produce a turbidity within about 15 to 30 seconds can be sprayed under normal spray conditions familiar to those skilled in the art.

Some combinations of polyisocyanates and crosslinking agents especially well suited for use in this invention are:

TDI—MOCA
TDI—ODCB
TDI—APS*
TODI—MOCA
TODI—ODCB
TODI—APS
MDI—MOCA
MDI—ODCB
Naphthalene diisocyanate—MOCA
Naphthalene diisocyanate—ODCB
Naphthalene diisocyanate—APS
4,4'-diphenyl diisocyanate—MOCA
4,4'-diphenyl diisocyanate—ODCB
4,4'-diphenyl diisocyanate—APS

*APS is bis(3,3'-amino phenyl) sulfone.

Any of the non-reactive solvents normally used in making paints which are suitable for spraying are useful in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, lower nitraparaffins, etc. Mixtures of solvents may be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about one to two parts of pigment per hundred parts of prepolymer by weight.

Submicroscopic pyrogenic silica has been found to be an effective leveling agent. This material is prepared by the vapor phase hydrolysis of silicon tetrachloride. Such silica, sold under the trademark Cab-O-Sil by Godfrey L. Cabot, Inc., is useful as a leveling agent in the sprayable polyurethane compositions when used in about 0.1 to 10 parts by weight per 100 parts of the prepolymer in the solution. The preferred amount is from about 0.5 to about 4 parts by weight. This range of pyrogenic silica gives improved thixotropic properties to the resulting sprayable composition.

The following examples further illustrate this invention. The parts and percentages are by weight unless otherwise indicated.

EXAMPLE 1

One sample each of cured natural rubber, cured butadiene/styrene rubber and neoprene were prepared, compounded and cured by conventional methods and washed with methyl ethyl ketone. The methyl ethyl ketone was allowed to evaporate from the samples. The size of each of the samples was 2 inches by 6 inches and each had a thickness of ¼ inch. Each of the samples was immersed in freshly prepared chlorine water at about 25° C. for 5 minutes following which the samples were removed from the chlorine water and dried.

The chlorine water was prepared by bubbling chlorine gas through 3.79 liters of water at 27° C. for 45 minutes. The chlorine water was analyzed to contain 0.0198 percent by weight available chlorine. The analysis was made by treating a sample of the chlorine water with excess potassium iodide and titrating with an 0.1 normal sodium thiosulfate solution to a starch end point.

A liquid polyurethane reaction mixture coat was applied to the dry chlorine water-treated surface of each of the samples. The polyurethane coats were cured at about 25° C. for about 24 hours to form a cured polyurethane coat having a thickness of about 1/16 inch. The coated samples were then submitted to a standard peel adhesion test. Results of the peel adhesion test indicated that the cured polyurethane coats adhered strongly to the samples:

Sample: Adhesion (lbs./in.)
  Natural rubber _____ 47
  Butadiene/styrene _____ 38
  Neoprene _____ 50

Normally the adhesion test when applied to such samples where the chlorine water treatment is not used shows negligible adhesion of the polyurethane layer to the elastomeric material.

The liquid polyurethane reaction mixture was prepared by mixing 100 parts by weight of a prepolymer solution with 11 parts by weight of a curative solution. The prepolymer of the prepolymer solution was prepared by reacting 6 mols of an 80/20 mol ratio mixture of 2,4-tolylene diisocyanate and 2,6-tolylene diisocyanate with two mols of an 80 ethylene/20 propylene daipate having a molecular weight of about 1900 and a hydroxyl number of 60 and 1 mol of tetramethylene adipate having a molecular weight of about 1900 and a hydroxyl number of 60 and 1 mol of tetramethylene adipate having a molecular weight of about 1900 and a hydroxy number of 60. This prepolymer was analyzed to have an isocyanate group content of from 3.8 to 4.0 percent by weight. A prepolymer solution was then prepared by adding to 2000 parts of the prepolymer, 600 parts of methyl ethyl ketone, 600 parts of toluene and 100 parts of a mixture comprising 10 percent by weight of cellulose acetate butyrate and 90 percent by weight of Cellosolve acetate.

The curative solution for the polyurethane reaction mixture was prepared by mixing 100 parts of 4,4'-methylene bis (2-chloroaniline), 15 parts of 2-mercaptobenzothiazole and 106 parts of methyl ethyl ketone.

EXAMPLE 2

The surface of a medallion as an integral portion of the sidewall of a pneumatic tire made principally of butadiene-styrene rubber and compounded, built, molded and cured by conventional methods was cleaned by washing with methyl ethyl ketone. The cleaned surface of the medallion was then treated by the application of chlorine water prepared by the method of Example 1 and containing about 0.2 percent by weight available chlorine, at about 25° C. for about 5 minutes. The chlorine water was removed from the treated sidewall by evaporation, thereby drying the surface of the medallion.

A red colored liquid polyurethane reaction mixture was coated onto the treated surface of the medallion on the sidewall of the tire and cured at about 25° C. for about 24 hours to provide a decorative red colored cured polyurethane adherent coating on the medallion which showed excellent adhesion and scuff resistance.

The liquid polyurethane reaction mixture was prepared by mixing 100 parts of a red prepolymer solution with 11 parts of a curative solution. The red prepolymer solution was prepared by adding 60 parts of pyrazolane red to 1000 parts of the prepolymer solution of Example 1 and ball milled for 16 hours. The curative solution used was that of Example 1.

EXAMPLE 3

The surface of a medallion as an integral portion of the sidewall of a pneumatic tire made principally of butadiene-styrene rubber compounded, molded and cured by conventional methods was cleaned with methyl ethyl ketone and treated with chlorine water according to the method of Example 2. A gold colored liquid polyurethane reaction mixture was spray coated onto the treated surface of the medallion and cured at about 25° C. for about 24 hours to provide a gold colored cured polyurethane adherent coating.

The gold liquid polyurethane reaction mixture was prepared by mixing 91.6 parts of a gold colored prepolymer solution with 9 parts of a curative solution. The prepolymer of the prepolymer solution was prepared by reacting 8 mols of 4,4'-dicyclohexyl methane diisocyanate with 1 mol of an 80-ethylene/20-propylene adipate having a molecular weight of about 1900 and a hydroxyl number of 60. The prepolymer was diluted by mixing 2000 parts of the prepolymer with 600 parts of methyl ethyl ketone, 600 parts of toluene and 100 parts of a mixture comprising 10 percent by weight cellulose acetate butyrate and 90 percent by weight Cellosolve acetate. The diluted prepolymer was analyzed to have an isocyanate content of 1.9 percent by weight.

The gold colored prepolymer solution was prepared by mixing 50 parts of the diluted prepolymer with 12.5 parts of China #7 pale gold bronze powder (obtained from The Ohio Bronze Company), 2.1 parts of Santocel 54 (obtained from The Monsanto Chemical Company), 25 parts of paraxylene and 2 parts of 10 percent Cobratec 96 in methyl ethyl ketone (a benzotriazole stabilizer obtained from The Maumee Chemical Company of Toledo, Ohio). The curative solution was prepared by mixing 450 parts of 1,4-cyclohexane bis(methylamine) and 1800 parts methyl isobutyl ketone.

EXAMPLE 4

A white polyurethane sidewall was integrally adhered to a black sidewall of a tire according to the following method. The surface of the black sidewall of an airplane tire made principally of butadiene-styrene rubber and compounded, built, molded and cured by conventional methods (size 6.50–10.00) was washed with methyl ethyl ketone, dried, and treated with chlorine water by immersion in chlorine water for 5 minutes at about 25° C. The chlorine water had an available chlorine content of about 0.2 percent. The surface of the black sidewall was then dried by evaporating the chlorine water at about 25° C.

A first coat of a compounded sulfur-curable polyurethane solution was sprayed onto the black sidewall surface. The coat was dried at about 25° C. until it was substantially tack-free.

A second coat of liquid polyurethane reaction mixture was sprayed onto the first polyurethane coat. The second coat was allowed to dry and at least partially cure at about 25° C. until it was substantially tack-free.

A third coat of a white colored and nondiscoloring liquid polyurethane reaction mixture was sprayed over the second polyurethane coat. The third was allowed to dry and cure at about 25° C. to form a decorative high gloss white sidewall on the tire which had excellent adhesion, scuff resistance and age resistance and could be easily cleaned.

The sprayable polyurethane for the first coat was prepared by compounding a sulfur curable polyurethane millable gum and adding a diluent to the compounded polyurethane gum. The sulfur curable polyurethane millable gum was the reaction product of a polymeric hydroxyl terminated polyester, glycerol-α-allyl ether, and o-tolidine diisocyanate (obtained as a polyurethane millable gum under the trade name "Cyanoprene VG" from the American Cyanamid Company). The sulfur curable polyurethane gum was compounded on a mill suitable for milling gum rubber according to the following recipe:

| Compound: | Parts by weight |
| --- | --- |
| Cyanoprene VG | 100 |
| Hi Sil 233 (a colloidal silica obtained from The Pittsburgh Plate Glass Company) | 15 |
| Cadmium stearate | 1 |
| Benzothiazolyl disulfide (MBTS) | 4 |
| Mercaptobenzothiazole (MBT) | 2 |
| MBTS-$ZnCl_2$ Complex (ratio of MBTS to $ZnCl_2$ is 2:1 | 1 |
| Sulfur | 1.75 |
| Total | 124.75 |

To 100 parts of the compounded polyurethane gum was then added 50 parts of N,N-dimethylformamide and 200 parts of methyl ethyl ketone. This mixture was mixed by rolling in a container with porcelain balls at about 25° C. for about 24 hours.

To 100 parts of this mixture was added about 30 parts of polymethylene polyphenyl isocyanate (obtained as Mondur MR from the Mobay Chemical Company), and 50 parts of Cellosolve acetate to form a sprayable mixture for the first coat The sprayable liquid polyurethane reaction mixture for the second coat, by mixing the prepolymer solution and curative solution of Example 1, was prepared at about 25° C.

The white sprayable liquid polyurethane reaction mixture for the third coat was prepared by first mixing 45 parts of titanium dioxide with 1000 parts of the diluted prepolymer of Example 3. By the term "diluted prepolymer of Example 3" is meant a prepolymer solution prepared according to the method of Example 3 without the China #7 gold bronze powder, Santocel 54, paraxylene, and the Cobratec 96 in methyl ethyl ketone. The mixture was rolled 16 hours in a ball mill. To 100 parts white diluted prepolymer was added 15 parts of the curative solution of Example 3 and 20 parts methyl ethyl ketone. The white sidewall was sprayed in the desired area.

EXAMPLE 5

A protective tread layer was applied to the tread of a large time (size 16.00–24) which is normally used with earthmoving vehicles and thereby subject to considerable scuffing and abrasion by the following method.

The large tire tread and sidewall were washed with methyl ethyl ketone to clean its surface and the methyl ethyl ketone removed by evaporation. The tire was then slowly rotated in a bath of chlorine water freshly prepared according to the method of Example 1 and having an available chlorine content of about 0.2 percent. In this way, the tread and sidewall of the tire were immersed in the chlorine water for about 10 to 15 minutes at about 25° C. The tread and sidewall of the tire were then dried by evaporation at about 25° C.

A first coat of compounded sulfur-curable polyurethane solution was sprayed onto the tread and sidewall of the tire while the tire was being slowly rotated. The coat was dried at 25° C. until it was essentially tack free.

Successive coats of a liquid polyurethane reaction mixture were then sprayed over the first coat while slowly rotating the tire. Each successive coat was dried until essentially tack free at about 25° C. before applying the next coat. Sufficient successive spray coats were applied to form a layer of polyurethane on the tread having a thickness of about 3/16 inch.

The first coat of compounded sulfur curable polyurethane solution was prepared according to the method of Example 4. The successive coats of a liquid polyurethane reaction mixture were prepared according to the method of Example 1.

EXAMPLE 6

A polyurethane surface having an increased coefficient of friction such as an increased resistance to skidding of vehicular tires was adhered to a rubber pad. The rubber pad was especially constructed to fit around railroad tracks to facilitate vehicular crossing of the railroad tracks.

The rubber pad had a rectangular surface dimension of 3 feet by 4 feet, was made principally of butadiene-styrene rubber, and was compounded, molded, and cured by conventional methods. The surface of the rubber pad was immersed in chlorine water for 5 minutes at about 25° C. and allowed to dry at about 25° C. The chlorine water had been prepared according to the method of Example 1 and had an available chlorine content of about 0.2 percent.

A first coat of a compounded sulfur curable polyurethane solution prepared according to the method of Example 4 was sprayed onto the surface of the rubber pad and allowed to dry until essentially tack free of about 25° C. for about 2 hours.

A second coat of a liquid polyurethane reaction mixture prepared according to the method of Example 1 was sprayed over the first coat of polyurethane and allowed to dry and cure at about 25° C. for about 20 hours. In a similar manner a third coat of the liquid polyurethane reaction was applied over the second coat and allowed to dry and cure at about 25° C. for about 24 hours.

Before the third coat was tack free, about 400 grams of walnut shells (obtained as 3040 W walnut shells from the Harwick Standard Chemical Company), were applied and adhered to the third polyurethane coat.

In a similar manner a fourth coat of the liquid polyurethane reaction mixture was sprayed over the second liquid polyurethane reaction mixture coat and about 400 grams of the walnut shells adhered to its surface. The coat was allowed to dry and cure at about 25° C. for about 24 hours.

A fifth coat of a liquid polyurethane reaction mixture was sprayed over the fourth polyurethane coat and walnut shells and allowed to dry and cure at about 25° C. The liquid polyurethane reaction mixture was also prepared according to the method of Example 1.

It is to be understood that various materials other than walnut shells can be added to a polyurethane reaction mixture coat either before or after the coating has been applied to various rubber articles, but before it has lost its tack, to vary the coefficient of friction of the polyurethane polymer, to give the polymer strength, or for decorative purposes. Preferably, such materials are added before the mixture has solidified. Representative materials are metallic particles and shavings, shredded wire, wire coils, fabric including glass and wool, sand, nut shells, sawdust, cork, Carborundum, tungsten carbide, hard particles of polyurethane, colored pigments and the like.

While certain representative embodiments and details have been shown for the purpose of illustrating the invention, it will be apparent to those skilled in this art that various changes and modifications may be made therein without departing from the spirit or scope of the invention.

I claim:

1. A method of preparing a composite structure comprising a layer of a cured polyurethane adhered to a treated surface of an elastomeric material, which comprises the steps of (A) treating the surface of the elastomeric material selected from natural rubber, rubbery copolymers of butadiene and styrene and rubbery polychloroprene with freshly prepared chlorine water for about 3 to about 15 minutes at a surface temperature of from about 20° C. to about 60° C., (B) substantially drying the treated surface by evaporation, (C) applying a liquid polyurethane reaction mixture to the treated surface and (D) curing the reaction mixture, where the chlorine water is prepared by bubbling chlorine gas through water and contains at least 0.1 percent by weight available chlorine at about 20° C. to about 30° C. and where the said liquid reaction mixture consists essentially of (a) a prepolymer of an organic diisocyanate and a polymeric polyol having a molecular weight between about 700 and about 5000 selected from polyester polyols, polyether polyols and dihydroxyl-terminated polymers of conjugated diene hydrocarbons, where the overall molar ratio of the isocyanate groups of the polyisocyanate to the reactive hydrogens of the polymeric polyols is between about 1.1/1 and about 12/1, and (b) at least one diamine having primary amino groups in a ratio of from about 0.5/1 to about 1.5/1 of amine groups to the isocyanate groups in excess of the reactive hydrogens of the reactive hydrogen-containing polymeric material.

2. A method according to claim 1 wherein the chlorine water is prepared by bubbling chlorine gas through water and comprises from about 0.1 to about 0.2 percent by weight available chlorine at about 20° C. to about 30° C., and where the elastomeric material is a cured copolymer of butadiene and styrene.

3. The method according to claim 2 where the said elastomeric material is the surface of the sidewall of a tire having a temperature of from about 0° C. to about 125° C. and where the temperature of the chlorine water is from about 20° C. to about 30° C.

4. The method according to claim 3 wherein the tire sidewall is cleaned with methyl ethyl ketone before treating with chlorine water.

5. A composite structure prepared according to the method of claim 1.

References Cited

UNITED STATES PATENTS

| 2,801,447 | 8/1957 | Wolinski | 117—47 |
| 3,025,186 | 3/1962 | Eekhout | 117—47 |
| 3,080,255 | 3/1963 | Winkelmann | 117—47 |
| 3,098,755 | 7/1963 | Barth et al. | 117—47 |
| 3,364,056 | 1/1968 | Seibel | 117—47 |

MURRAY KATZ, Primary Examiner

U.S. Cl. X.R.

117—47 A, 138.8 UA, 139